No. 761,530. PATENTED MAY 31, 1904.
G. A. MUNSON.
AIR HEATING APPARATUS.
APPLICATION FILED JUNE 6, 1903.
NO MODEL. 3 SHEETS—SHEET 1.

WITNESSES:
Edwin F. McKee
Herbert D. Lawson

INVENTOR
George A. Munson
BY
Victor J. Evans
Attorney

No. 761,530. PATENTED MAY 31, 1904.
G. A. MUNSON.
AIR HEATING APPARATUS.
APPLICATION FILED JUNE 6, 1903.

NO MODEL

3 SHEETS—SHEET 2.

WITNESSES:
Edwin F. McKee
Herbert D. Lawson

INVENTOR
George A. Munson
BY
Victor J. Evans Attorney

THE NORRIS PETERS CO., PHOTO-LITHO., WASHINGTON, D. C.

No. 761,530. PATENTED MAY 31, 1904.
G. A. MUNSON.
AIR HEATING APPARATUS.
APPLICATION FILED JUNE 6, 1903.
NO MODEL. 3 SHEETS—SHEET 3.

WITNESSES:
Edwin G. McKee
Herbert D. Lawson.

INVENTOR
George A. Munson
BY
Victor J. Evans Attorney

No. 761,530.　　　　　　　　　　　　　　　　　Patented May 31, 1904.

UNITED STATES PATENT OFFICE.

GEORGE A. MUNSON, OF CONNELLSVILLE, PENNSYLVANIA.

AIR-HEATING APPARATUS.

SPECIFICATION forming part of Letters Patent No. 761,530, dated May 31, 1904.

Application filed June 6, 1903. Serial No. 160,428. (No model.)

*To all whom it may concern:*

Be it known that I, GEORGE A. MUNSON, a citizen of the United States, residing at Connellsville, in the county of Fayette and State of Pennsylvania, have invented new and useful Improvements in Air-Heating Apparatus, of which the following is a specification.

My invention relates to new and useful improvements in air-heating apparatus; and its object is to provide a heater of novel construction whereby air may be quickly heated.

A further object is to so construct the heater as to regulate the size of the air-heating surface within the heater.

A further object is to provide walls for the heater which are so constructed as to practically prevent the radiation of heat therefrom into the compartment in which the heater is located.

Another object is to fasten the walls of the casing together so as to prevent the passage of air, moisture, or dust through the joints thereof.

A further object is to so construct the walls of the heater as to present a large area to which heat-conducting pipes may be secured.

With the above and other objects in view the invention consists in the novel construction and combination of parts hereinafter more fully described and claimed, and illustrated in the accompanying drawings, showing the preferred form of my invention, and in which—

Figure 1:
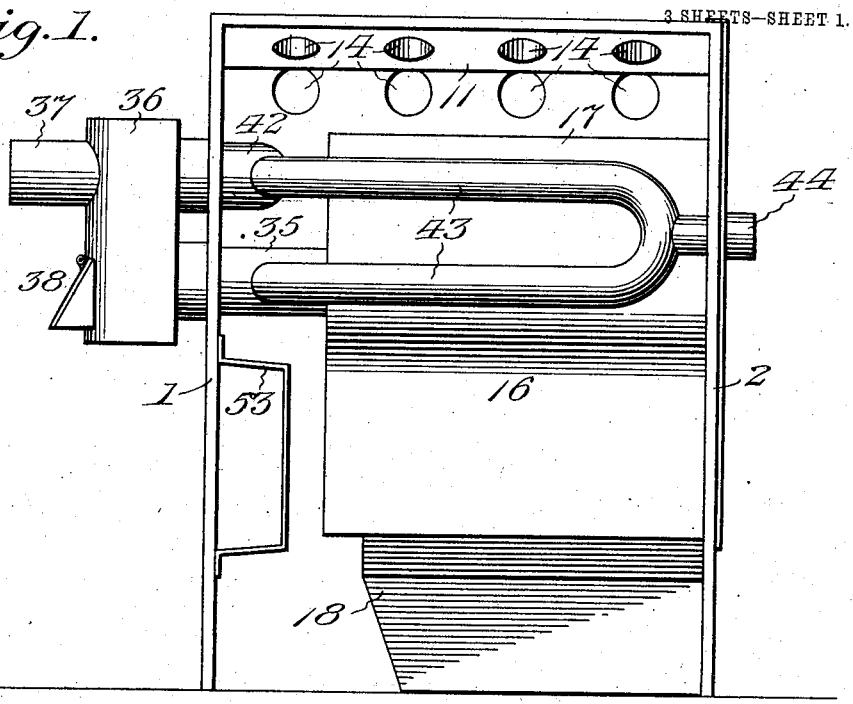
Figure 2:
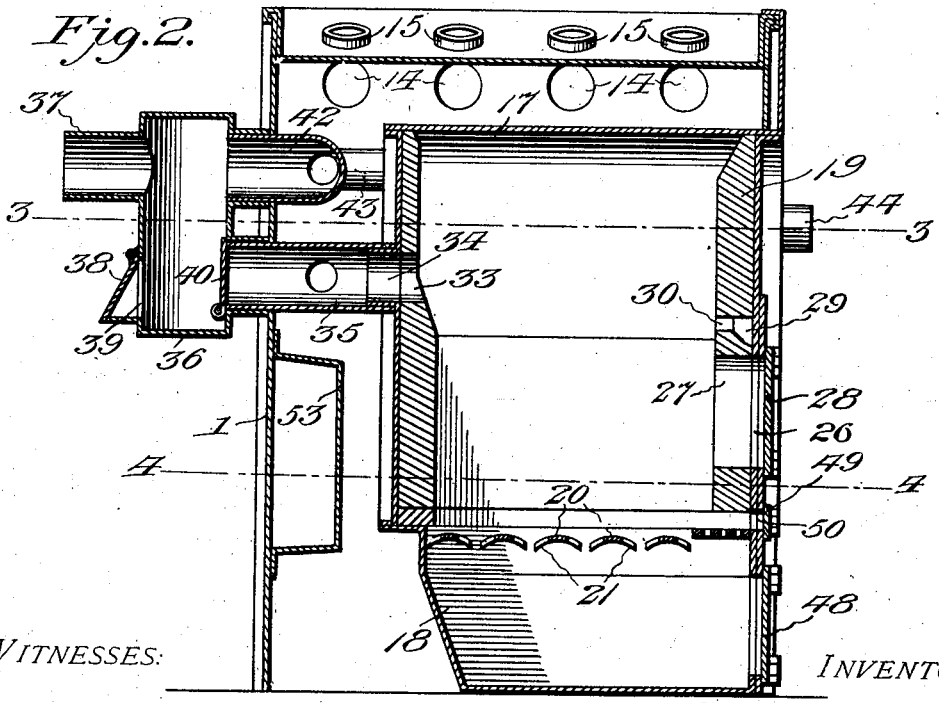
Figure 3:
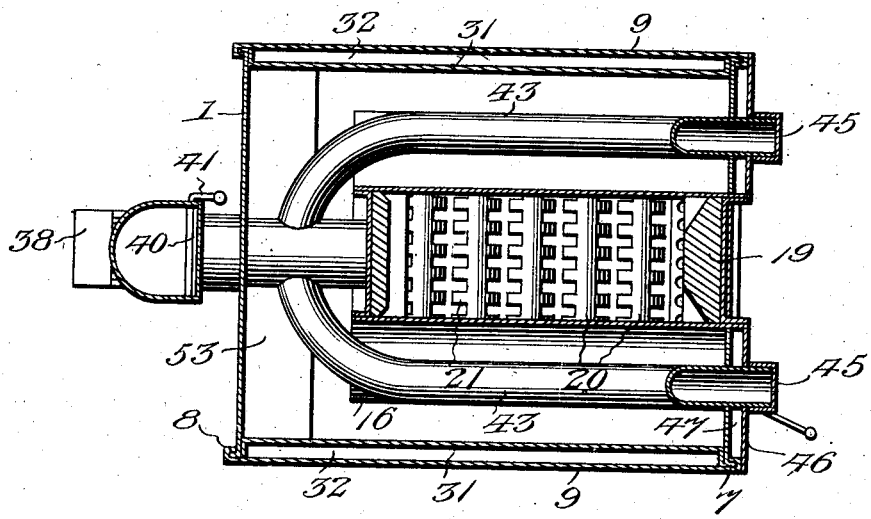
Figure 4:
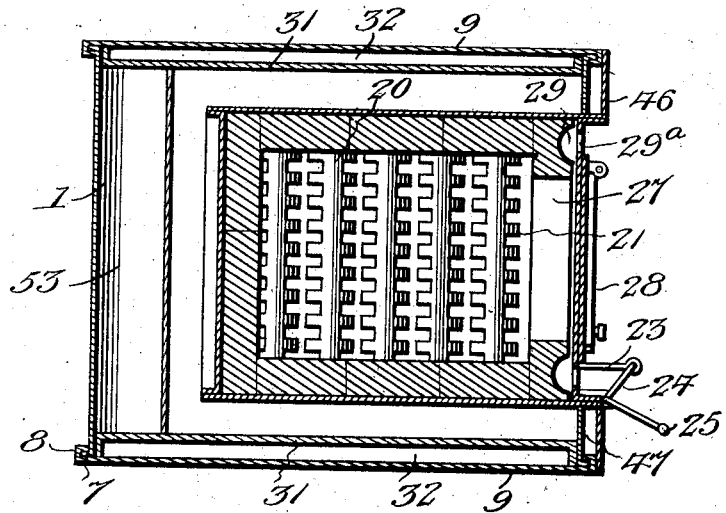
Figure 5:
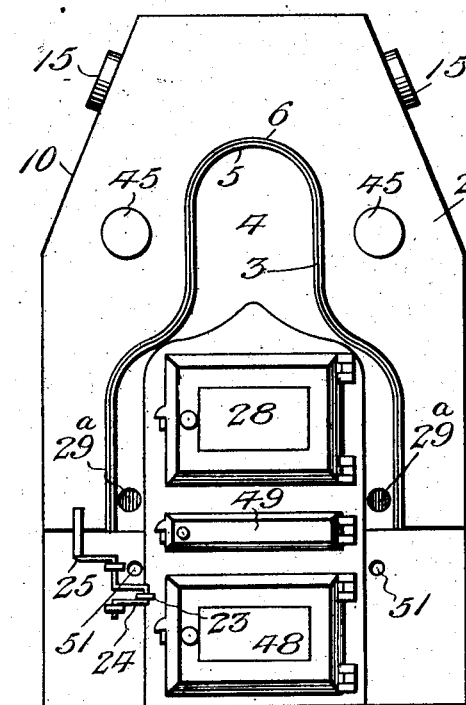
Figure 6:
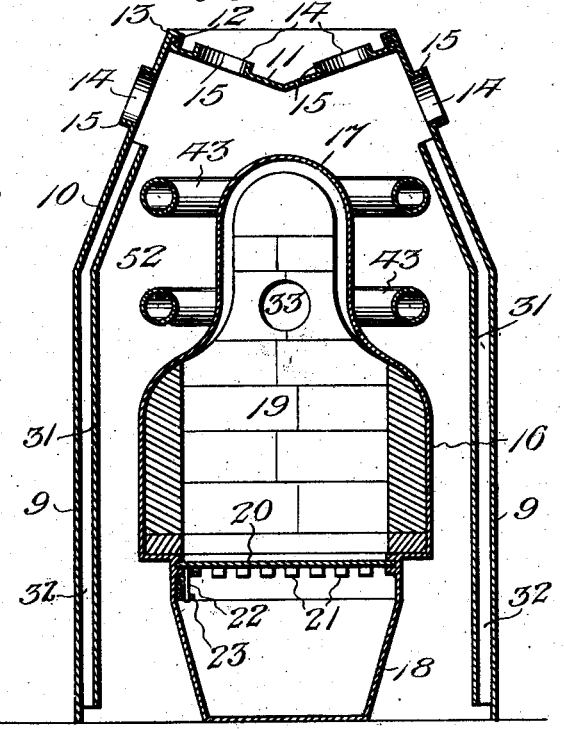
Figure 7:
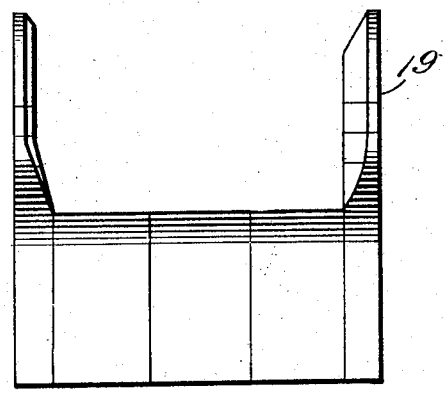
Figure 8:
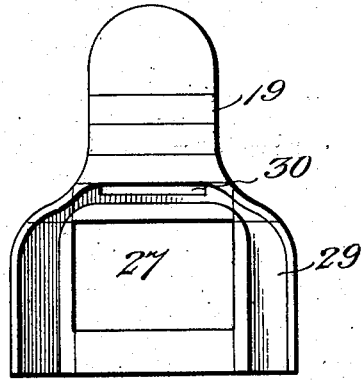

Figure 1 is a side elevation of my improved heater with the side wall thereof removed. Fig. 2 is a central vertical longitudinal section therethrough. Fig. 3 is a section on line 3 3, Fig. 2. Fig. 4 is a section on line 4 4, Fig. 2. Fig. 5 is a front elevation of the heater. Fig. 6 is a vertical transverse section therethrough. Fig. 7 is a side elevation of the lining of the fire-box removed, and Fig. 8 is a front elevation thereof.

Referring to figures by numerals of reference, 1 is the rear wall, and 2 the front wall, of the heater, and this front wall is provided with an aperture 3, which is normally closed by means of a head 4. This head is fastened within the aperture in any suitable manner, the same being preferably provided with a flange 5, which fits within and abuts against a flange 6, arranged along the edges of the aperture. Bolts or any other suitable clamping devices (not shown) may be used for securing the two flanges 5 and 6 together. End walls 1 and 2 have forwardly-extending flanges 7 at the edges thereof, which are overlapped and engaged by flanges 8, arranged at the edges of side walls 9. The upper portions of these side walls are inclined, as shown at 10, and the top 11 of the casing is V-shaped in cross-section and has flanges 12 at its side edges, which are overlapped and engaged by flanges 13 at the upper edges of the side walls. Outlet-openings 14 are formed at desired intervals within the upper portions of the side walls and in the top 11. These openings are inclosed by flanges 15, which permit heat-conducting pipes to be readily connected thereto.

Arranged within the casing herein described is a fire-box 16, formed of any suitable material and having its upper portion 17 reduced in width. This fire-box is preferably supported within the casing upon an ash-box 18, which is adapted to rest upon the base of the furnace and extends longitudinally of the fire-box. A lining 19, of fire-brick, is arranged within the fire-box and extends forward at the ends into the reduced portion 17 thereof. The grate-bars 20 are journaled at opposite ends in the sides of the ash-box, at the upper edge thereof, and these bars have oppositely-extending arms 21, as shown in Figs. 3 and 4. Each bar 20 also has a downwardly-extending arm 22, which engages a notched bar 23, slidably mounted within and extending longitudinally of the ash-box, and this bar projects through the front wall of the heater and is connected to a crank 24, which is journaled upon the front of the heater and is operated by a crank 25 at the upper end thereof. By swinging the crank 25 back and forth the rod 23 is reciprocated and the grate-bars 20 caused to simultaneously work upon their pivots. The lining 19 of the fire-box has an opening 26 in its front, which registers with a feed-opening 27, and this opening is normally closed by a suitable door 28. A groove 29 is formed within the front of the lining 19 and around the opening 26 and communicates with a slot 30, formed above said opening and communicating with the upper portion of the fire-box. This groove 29 is for the purpose of receiving air from apertures 29ª in the front of the heater and supplying it to the gases which ordinarily accumulate about the feed-inlet to the fire-box, and the same are therefore consumed and prevented from flowing outward into the compartment in which the heater is located. The side walls 9 of the heater are provided with jackets 31, which form air-chambers 32. These jackets extend upward to points adjacent the lowest set of apertures 14, and the compartments 32 formed thereby serve to prevent radiated heat from coming in direct contact with the outer walls of the heater.

An outlet 33 is formed in the back of the fire-box, near the upper end thereof, and is inclosed by a flange 34, which extends into a pipe-section 35. This section opens into a drum 36, located in rear of the wall 1, and having an outlet-pipe 37 near its upper end, adapted to be connected to a chimney in any suitable manner. A check-draft door 38 is arranged adjacent an opening 39, formed in the drum 36, preferably in alinement with the pipe-section 35, and a damper 40 is preferably located in the outlet end of pipe-section 35 and is adapted to be raised or lowered, as desired, by means of a rod 41, extending to one side of the casing. A pipe-section 42 extends from the upper portion of the drum 36 into the rear wall of the heater, and this pipe-section is preferably in alinement with the outlet 37. A U-shaped pipe 43 is arranged at each side of the reduced portion 17 of the fire-box, and the ends of these pipes communicate with opposite sides of the pipe-sections 35 and 42, respectively. A pipe-section 44 extends from the front or intermediate portion of each pipe 43 and through the front wall of the heater, and this pipe-section is adapted to be normally closed by means of a cap 45.

That portion of the front wall of the heater which is removed from the head 4 is provided with an outer jacket 46, which forms an air-chamber 47, provided for the same purpose as the chambers 32, hereinbefore described. A door 48 is provided for an opening leading into the ash-pit 18, and another door 49 is provided for an opening 50, arranged in the front of the heater directly above the level of the grate therein. By providing these openings 50 clinkers can be readily removed from the grate. A suitable number of apertures 51 may be provided for the purpose of admitting air to the compartment 52, formed between the fire-box and the outer walls of the heater. A combined brace and jacket 53 is fastened to the inner face of the rear wall 1 of the casing, as shown in Figs. 1 and 4, and forms an air-chamber, thereby preventing radiated heat from coming into contact with said wall 1.

When fuel is burned upon the grate of the heater, the products of combustion pass through the outlet 33 into the pipe-section 35 and thence into drum 36 to the outlet 37. The heat radiated from the walls of the fire-box will soon raise the temperature of the air flowing through the compartment 52 and apertures 14. Should it be desired, however, to increase the temperature of the air discharged from the furnace, the damper 40 is closed. The products of combustion will then pass through the outlet 33 into the lower portions of the two pipes and thence through said pipes into the upper pipe-section 42. From this pipe-section the products will pass through the drum 36 and outlet 37. In this manner the heating-surface within the apparatus is practically doubled, and an intensely hot air can thus be produced by the heater. Should it be desired to regulate the draft in the furnace, the door 38 can be opened a desired distance. By forming the walls and top of the heater in the manner shown and described a large number of apertures 14 can be formed therein and the furnace therefor used for supplying air to a proportionately-large number of registers.

The furnace is extremely compact, simple, and durable in construction and can be readily cleaned and produces an intense heat with a small amount of fuel. Practically none of the heat is wasted when the heating pipes or coils 43 are used. By providing a head 4 in the front wall of the casing the lining of the fire-box may be readily removed or inserted. By removing the caps 45 the pipes 43 may be readily cleaned of soot or other material which may accumulate therein.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a heater, the combination with a casing having jackets upon the walls thereof forming air-compartments; of a fire-box within the casing, pipes partly inclosing the fire-box and within the casing, a drum, pipe-sections communicating with said pipes and the drum, one of said sections opening into the fire-box, and a damper within the drum.

2. In a heater, a casing comprising end walls, flanges at the edges thereof, side walls, flanges integral therewith and overlapping the flanges of the end walls, said side walls having inclined upper portions, a V-shaped top to the casing engaging the side walls, said top
5 and the inclined portions of the side walls having apertures and jackets upon the inner faces of the walls.

In testimony whereof I affix my signature in presence of two witnesses.

GEORGE A. MUNSON.

Witnesses:
HARRY M. POWELL,
EDWIN T. LIME.